United States Patent [19]
Dietl et al.

[11] Patent Number: 6,149,833
[45] Date of Patent: Nov. 21, 2000

[54] METHOD OF MELTING SNOW AND/OR ICE AND A DEICER COMPRISING SODIUM FORMATE AND SODIUM CHLORIDE

[75] Inventors: Harald Artur Dietl, Burgkirchen; Achim Stankowiak, Altötting, both of Germany

[73] Assignee: Clariant GmbH, Frankfurt, Germany

[21] Appl. No.: 09/408,462

[22] Filed: Sep. 29, 1999

[30] Foreign Application Priority Data

Oct. 2, 1998 [DE] Germany .......................... 198 45 490

[51] Int. Cl.$^7$ ........................................... C09K 3/18
[52] U.S. Cl. .............................................. 252/70; 106/13
[58] Field of Search .................................. 252/70; 106/13

[56] References Cited

U.S. PATENT DOCUMENTS

| | | | |
|---|---|---|---|
| 4,388,203 | 6/1983 | Nimerick et al. | 252/70 |
| 4,664,832 | 5/1987 | Sandvig et al. | 252/70 |
| 4,746,449 | 5/1988 | Peel | 252/70 |
| 4,855,071 | 8/1989 | Todd, Jr. et al. | 252/70 |
| 5,238,592 | 8/1993 | Stankowiak et al. | 252/70 |
| 5,843,330 | 12/1998 | Barbour et al. | 252/70 |
| 5,849,356 | 12/1998 | Gambino et al. | 252/70 |
| 5,922,241 | 7/1999 | Becker et al. | 252/70 |

FOREIGN PATENT DOCUMENTS 0 483 721   5/1992   European Pat. Off. .

OTHER PUBLICATIONS

EPO Search Report (Jan. 2000).

*Primary Examiner*—Anthony Green
*Attorney, Agent, or Firm*—Milas B. Dearth; Scott E. Hanf

[57] ABSTRACT

The invention provides a method of melting snow and ice on traffic areas, which comprises applying to the traffic areas covered with snow and ice a deicer in an amount of from 5 to 100 g/m$^2$, which comprises from 30 to 70% by weight of sodium formate, from 30 to 70% by weight of sodium chloride and from 0.1 to 3% by weight of a corrosion inhibitor, and which is used in the form of solid particles having a diameter of from 0.3 to 10 mm or in aqueous solution with a content of from 5 to 25% by weight of the deicer.

10 Claims, No Drawings

METHOD OF MELTING SNOW AND/OR ICE AND A DEICER COMPRISING SODIUM FORMATE AND SODIUM CHLORIDE

FIELD OF THE INVENTION

The present invention relates to a method of melting snow and/or ice on traffic areas by applying a deicer comprising a compact of sodium formate and sodium chloride. The invention further relates to improved protection against corrosion for steel and galvanized steel.

DESCRIPTION OF THE RELATED ART

Snow and/or ice on roads, cycle paths, footpaths, bridges, sports grounds, airfields and the like, referred to below as traffic areas, lead to a substantial impairment in the progress of traffic and in traffic safety. For this reason, it has long been known to apply to such areas water-soluble salts (deicers) to melt (thaw) ice and snow and form an aqueous solution of the salt with a correspondingly lowered freezing point.

The requirements to be met by a deicer are multifaceted. The materials from which the areas in question are constructed, for example concrete, must not be damaged, and certainly not destroyed, by the deicer. It is also essential to exclude a corrosive action on metals, inter alia. It must also be ensured that there is no risk of fire as a result of the deicer being readily flammable and combustible. Its composition should be largely physiologically unobjectionable for animals and humans. Since the composition can also enter effluent, biodegradability is a further requirement. The thawing composition may pass not only into effluent, but also onto soil used agriculturally, which likewise should not be harmed. It is also essential that very rapid thawing is achieved. Finally, from the point of view of cost it is necessary that only a small amount of deicer is required and that the costs thereof are low.

In view of these requirements, the deicers which are cited in the prior art as being advantageous are mainly alkali metal chlorides and alkaline earth metal chlorides and also alkali metal and alkaline earth metal salts of organic acids. For example, U.S. Pat. No. 4,855,071 discloses alkali metal and/or alkaline earth metal carboxylates having from 1 to 4 carbon atoms prepared by a particular process as deicers, with calcium/magnesium acetate or sodium acetate being essentially recommended in particular.

EP-A-0 483 721 describes a liquid deicer which essentially consists of water, an alkali metal acetate and/or alkaline earth metal acetate and specific corrosion inhibitors.

Although the known deicers based on alkali metal chlorides or alkaline earth metal chlorides and based on alkali metal and/or alkaline earth metal carboxylates satisfy some of the above requirements, they are unsatisfactory, in particular with regard to the following:

The action of a salt as a deicer is based, as already mentioned at the outset, on the lowering of the freezing point of water by the salt. However, a high penetration rate and thaw or melt capacity of a deicer is also of critical importance. This results not only in an increased rate of the thaw or melt process upon thawing and or melting of ice and/or snow, but also in a reduction in the amount of deicer during thawing and/or melting of ice and/or snow. Furthermore, a better solid deicer than the deicers already described above in solid form should be notable for the fact that its granules, compacts, spray granules and/or crystals are largely stable to separation out of the individual constituents, and also to mechanical attrition.

Accordingly, the object of the present invention is to propose a deicer comprising alkali metal chlorides and/or alkaline earth metal chlorides and also alkali metal carboxylates and/or alkaline earth metal carboxylates, which is highly effective at lowering the freezing point, during the operation of thawing (melting) of ice and snow penetrates ice and/or snow more quickly than thawing agents hitherto, and offers long-lasting protection against refreezing. This deicer should also be stable to separation out of the individual components and also be mechanically stable to attrition in order to largely reduce the proportion of fine dust produced as a result of transportation. The deicer should also be ecologically and physiologically unobjectionable, not exert a corrosive effect, or exert only a slight corrosive effect, on metals and the paving of traffic areas, and should be biologically well tolerated and be easy to handle and storable. Such a deicer would be especially advantageous in all cases requiring rapid and also prolonged thawing of ice and/or snow.

SUMMARY OF THE INVENTION

Surprisingly, it has been found that a compact of sodium formate and sodium chloride and a suitable corrosion inhibitor in small amounts has all of the required properties when used as a deicer.

The invention provides a method of melting snow and ice on traffic areas, which comprises applying to the traffic areas covered with snow and ice a deicer in an amount of from 5 to 100 g/m$^2$, which comprises from 30 to 70% by weight of sodium formate, from 30 to 70% by weight of sodium chloride and from 0.1 to 3% by weight of a corrosion inhibitor, and which is used in the form of solid particles having a diameter of from 0.3 to 10 mm or in aqueous solution with a content of from 5 to 25% by weight of the deicer.

The invention further provides a deicer for traffic areas comprising from 30 to 70% by weight of sodium formate, from 30 to 70% by weight of sodium chloride and from 0.1 to 3% by weight of a corrosion inhibitor and in the form of solid particles from 0.3 to 10 mm in size.

In another aspect there is provided a method of applying to traffic areas covered with snow and ice, a deicer, in an amount of from 5 to 100 g/m$^2$, the deicer comprises from 40 to 60% by weight of sodium formate, from 40to 60% by weight of sodium chloride and from 0.1 to 2% by weight of a corrosion inhibitor, and which is used in the form of solid particles having a diameter of from 0.3 to 10 mm or in aqueous solution with a content of from 5 to 25% by weight of the deicer.

DESCRIPTION OF THE PREFERRED EMBODIMENTS

The corrosion inhibitor reduces the corrosivity of the deicer, in particular towards steel and galvanized steel. Suitable corrosion inhibitors are the corrosion inhibitors described as known in the prior art. In a preferred embodiment of the invention, this corrosion inhibitor consists of silicates, phosphates, high molecular weight copolymers or phosphonates, or mixtures of two or more of these classes of compound. Particularly preferred examples of corrosion inhibitors are sodium metasilicate, tripotassium phosphate, styrene-maleic acid copolymers and aminotris (methylenephosphonic acid)/zinc sulfate. Particularly preferred mixtures of corrosion inhibitors comprise from 1.8 to 2.2% by weight of sodium metasilicate, from 0.18 to 0.22% by weight of tripotassium phosphate, from 0.02 to 0.07% by weight of styrene-maleic acid copolymers and from 0.0001 to 0.01% by weight of a mixture of 1 part by weight of aminotris(methylenephosphonic acid) and 5 parts by weight of zinc sulfate.

In a preferred embodiment of the invention, the deicer comprises from 45 to 63% by weight of sodium formate, from 37 to 55% by weight of sodium chloride and from 0.3 to 2.8% by weight of corrosion inhibitor. In a particularly preferred embodiment of the invention, the quantity ratio is from 58 to 62% by weight of sodium formate, from 38 to 42% by weight of sodium chloride and from 2 to 2.5% by weight of corrosion inhibitor. The preferred features for the deicer according to the invention are also preferred features for the method according to the invention.

The particle size of the deicer is preferably from 0.5 to 5 mm, in particular from 1 to 3 mm.

The method of deicing traffic areas is preferably carried out using an amount of deicer which is between 10 and 80 g/m², in particular 15 and 60 g/m².

If an aqueous solution of the deicer is used in the method, then its content of deicer is preferably from 15 to 25% by weight, based on the weight of the solution.

The deicer can be applied to the traffic areas in the customary manner, such as, for example, by spreading vehicles.

EXAMPLES

The invention will now be illustrated in more detail using examples and comparative examples.

Example 1

A 2 mm-thick layer of ice was produced in a cold room at a temperature of −6° C. 60 g/m² of particles of a compact comprising 58–62% by weight of sodium formate and 30–42% by weight of sodium chloride and 2–2.5% by weight of the new type of corrosion inhibitor described above were applied uniformly on the layer of ice. The size of the particles was between 1 and 3 mm. After a contact time of 30 minutes at −6° C., the ice still present which had not melted was weighed, and the weight of this amount of ice was subtracted from the weight of the original amount of ice to give the amount of molten ice, as the melt water formed, in percent by weight, based on the original amount of ice.

Result:

After contact time of 30 minutes at −6° C., 22% by weight of ice had melted.

Example 2

A 2 mm-thick layer of ice was produced in a cold room at a temperature of −6° C. 60 g/m² of particles of a compact comprising 58–62% by weight of sodium formate and 30–42% by weight of sodium chloride and 2–2.5% by weight of the new type of corrosion inhibitor described above were applied uniformly on the layer of ice. The size of the particles was between 1 and 3 mm. After a contact time of 60 minutes at −6° C., the ice still present which had not melted was weighed, and the weight of this amount of ice was subtracted from the weight of the original amount of ice to give the amount of molten ice, as the melt water formed, in percent by weight, based on the original amount of ice.

Result:

After contact time of 60 minutes at −6° C., 35% by weight of ice had melted.

Example 3

A 2 mm-thick layer of ice was produced in a cold room at a temperature of −6° C. 42 g/m² of particles of a compact comprising 58–62% by weight of sodium formate and 30–42% by weight of sodium chloride and 2–2.5% by weight of the new type of corrosion inhibitor described above, moistened with 18 g/m² of a 25% by weight aqueous calcium chloride solution were applied uniformly on the layer of ice. The size of the particles was between 1 and 3 mm. After a contact time of 30 minutes at −6° C., the ice still present which had not melted was weighed, and the weight of this amount of ice was subtracted from the weight of the original amount of ice to give the amount of molten ice, as the melt water formed, in percent by weight, based on the original amount of ice.

Result:

After contact time of 30 minutes at −6° C., 21% by weight of ice had melted.

Example 4

A 2 mm-thick layer of ice was produced in a cold room at a temperature of −6° C. 42 g/m² of particles of a compact comprising 58–62% by weight of sodium formate and 38–42% by weight of sodium chloride and 2–2.5% by weight of the new type of corrosion inhibitor described above, moistened with 18 g/m² of a 25% by weight aqueous calcium chloride solution were applied uniformly on the layer of ice. The size of the particles was between 1 and 3 mm. After a contact time of 60 minutes at −6° C., the ice still present which had not melted was weighed, and the weight of this amount of ice was subtracted from the weight of the original amount of ice to give the amount of molten ice, as the melt water formed, in percent by weight, based on the original amount of ice.

Result:

After contact time of 60 minutes at −6° C., 34% by weight of ice had melted.

Example 5

A 5 cm-thick layer of ice was produced in a cold room at a temperature of −10° C. 0.15 g of particles of a compact comprising 58–62% by weight of sodium formate and 38–42% by weight of sodium chloride and 2–2.5% by weight of the new type of corrosion inhibitor described above were applied in heaps to the layer of ice. The size of the particles was between 1 and 3 mm. After a contact time of 120 minutes at −10° C., the depth of penetration of the particles into the ice was determined.

Result:

After contact time of 120 minutes at −10° C., the particles had penetrated to a depth of 25 mm into the ice.

Example 6

The corrosion behavior at (35±1)° C. with a test time of 7 days toward steel (C 45) of the new type of thawing agent consisting of 58–62% by weight of sodium formate and 38–42% by weight of sodium chloride and 2–2.5% by weight of the new type of corrosion inhibitor described above was tested in 5% strength aqueous solution in accordance with ASTM F 483. The total area of the steel test piece is 25.0 cm².

Result:

The erosion was ±0.0 mg, which corresponds to an erosion rate of ±0.0 mg/cm²/24 h.

Example 7

The corrosion behavior at (35 ±1)° C. with a test time of 7 days toward galvanized steel (St 10, LH No. 411510693) of the new type of thawing agent consisting of 58–62% by weight of sodium formate and 38–42% by weight of sodium chloride and 2–2.5% by weight of the new type of corrosion inhibitor described above was tested in 5% strength aqueous solution in accordance with ASTM F 483. The total area of the steel test piece is 25.0 cm$^2$.

Result:

The erosion was −0.8 mg, which corresponds to an erosion rate of ±0.01 mg/cm$^2$/24 h.

Comparative Example 1

A 2 mm-thick layer of ice was produced in a cold room at a temperature of −6° C. 60 g/m$^2$ of particles of a compact comprising sodium formate were applied uniformly to the layer of ice. The size of the particles was between 1 and 3 mm. After a contact time of 30 minutes at −6° C., the ice still present which had not melted was weighed, and the weight of this amount of ice was subtracted from the weight of the original amount of ice to give the amount of molten ice, as the melt water formed, in percent by weight, based on the original amount of ice.

Result:

After contact time of 30 minutes at −6° C., 20% by weight of ice had melted.

Comparative Example 2

A 2 mm-thick layer of ice was produced in a cold room at a temperature of −6° C. 60 g/m$^2$ of particles of a compact comprising sodium formate were applied uniformly to the layer of ice. The size of the particles was between 1 and 3 mm. After a contact time of 60 minutes at −6° C., the ice still present which had not melted was weighed, and the weight of this amount of ice was subtracted from the weight of the original amount of ice to give the amount of molten ice, as the melt water formed, in percent by weight, based on the original amount of ice.

Result:

After contact time of 60 minutes at −6° C., 32% by weight of ice had melted.

Comparative Example 3

A 2 mm-thick layer of ice was produced in a cold room at a temperature of −6° C. 42 g/m$^2$ of particles of a compact comprising sodium formate moistened with 18 g/m$^2$ of a 25% by weight aqueous calcium chloride solution were applied uniformly to the layer of ice. The size of the particles was between 1 and 3 mm. After a contact time of 30 minutes at −6° C., the ice still present which had not melted was weighed, and the weight of this amount of ice was subtracted from the weight of the original amount of ice to give the amount of molten ice, as the melt water formed, in percent by weight, based on the original amount of ice.

Result:

After contact time of 30 minutes at −6° C., 14% by weight of ice had melted.

Comparative Example 4

A 2 mm-thick layer of ice was produced in a cold room at a temperature of −6° C. 42 g/m$^2$ of particles of a compact comprising sodium formate moistened with 18 g/m$^2$ of a 25% by weight aqueous calcium chloride solution were applied uniformly to the layer of ice. The size of the particles was between 1 and 3 mm. After a contact time of 60 minutes at −6° C., the ice still present which had not melted was weighed, and the weight of this amount of ice was subtracted from the weight of the original amount of ice to give the amount of molten ice, as the melt water formed, in percent by weight, based on the original amount of ice.

Result:

After contact time of 60 minutes at −6° C., 28% by weight of ice had melted.

Comparative Example 5

A 2 mm-thick layer of ice was produced in a cold room at a temperature of −6° C. 42 g/m$^2$ of particles of a compact comprising sodium chloride moistened with 18 g/m$^2$ of a 25% by weight aqueous calcium chloride solution were applied uniformly to the layer of ice. The size of the particles was between 1 and 3 mm. After a contact time of 30 minutes at −6° C., the ice still present which had not melted was weighed, and the weight of this amount of ice was subtracted from the weight of the original amount of ice to give the amount of molten ice, as the melt water formed, in percent by weight, based on the original amount of ice.

Result:

After contact time of 30 minutes at −6° C., 15% by weight of ice had melted.

Comparative Example 6

A 2 mm-thick layer of ice was produced in a cold room at a temperature of −6° C. 42 g/m$^2$ of particles of a compact comprising sodium chloride moistened with 18 g/m$^2$ of a 25% by weight aqueous calcium chloride solution were applied uniformly to the layer of ice. The size of the particles was between 1 and 3 mm. After a contact time of 60 minutes at the stated −6° C., the ice still present which had not melted was weighed, and the weight of this amount of ice was subtracted from the weight of the original amount of ice to give the amount of molten ice, as the melt water formed, in percent by weight, based on the original amount of ice.

Result:

After contact time of 60 minutes at −6° C., 28% by weight of ice had melted.

Comparative Example 7

A 5 cm-thick layer of ice was produced in a cold room at a temperature of −10° C. 0.15 g of particles of a compact comprising sodium formate were applied in heaps to the layer of ice. The size of the particles was between 1 and 3 mm. After a contact time of 120 minutes at −10° C., the depth of penetration of the particles into the ice was determined.

Result:

After a contact time of 120 minutes at −10° C., the particles had penetrated to a depth of 17 mm into the ice.

Comparative Example 8

A 5 cm-thick layer of ice was produced in a cold room at a temperature of −10° C. 0.15 g of particles of sodium chloride were applied in heaps to the layer of ice. The size of the particles was between 1 and 3 mm. After a contact time of 120 minutes at −10° C., the depth of penetration of the particles into the ice was determined.

Result:

After a contact time of 120 minutes at −10° C., the particles had penetrated to a depth of 17 mm into the ice.

Comparative Example 9

The corrosion behavior at (35±1)° C. with a test time of 7 days toward steel (C 45) of the thawing agent sodium formate was tested in 5% strength aqueous solution in accordance with ASTM F 483. The total area of the steel test piece is 25.0 cm$^2$.

Result:

The erosion was −18.7 mg, which corresponds to an erosion rate of −0.11 mg/cm$^2$/24 h.

Comparative Example 10

The corrosion behavior at (35±1)° C. with a test time of 7 days toward galvanized steel (St 10, LH No. 411510693) of the thawing agent sodium chloride was tested in 5% strength aqueous solution in accordance with ASTM F 483. The total area of the steel test piece is 25.0 cm$^2$.

Result:

The erosion was −27.5 mg, which corresponds to an erosion rate of −0.16 mg/cm$^2$/24 h.

Comparative Example 11

The corrosion behavior at (35±1)° C. with a test time of 7 days toward steel (C 45) of the thawing agent sodium chloride was tested in 5% strength aqueous solution in accordance with ASTM F 483. The total area of the steel test piece is 25.0 cm$^2$.

Result:

The erosion was −20.4 mg, which corresponds to an erosion rate of −0.12 mg/cm$^2$/24 h.

Comparative Example 12

The corrosion behavior at (35±1)° C. with a test time of 7 days toward galvanized steel (St 10, LH No. 411510693) of the thawing agent sodium formate was tested in 5% strength aqueous solution in accordance with ASTM F 483. The total area of the steel test piece is 25.0 cm$^2$.

Result:

The erosion was −69.8 mg, which corresponds to an erosion rate of −0.40 mg/cm$^2$/24 h.

What is claimed is:

1. A method of melting snow and ice on traffic areas, which comprises applying to the traffic areas covered with snow and ice a deicer, in an amount of from 5 to 100 g/m$^2$, which comprises from 30 to 70% by weight of sodium formate, from 30 to 70% by weight of sodium chloride and from 0.1 to 3% by weight of a corrosion inhibitor, and which is used in the form of solid particles having a diameter of from 0.3 to 10 mm or in aqueous solution with a content of from 5 to 25% by weight of the deicer.

2. The method as claimed in claim 1, wherein a deicer comprising from 45 to 63% by weight of sodium formate, from 37 to 55% by weight of sodium chloride and from 0.3 to 2.8% by weight of corrosion inhibitor is applied.

3. The method as claimed in claim 1, wherein the particle size of the deicer is from 0.5 to 5 mm.

4. The method as claimed in claim 1, wherein the amount of deicer is between 10 and 80 g/m$^2$.

5. The method as claimed in claim 1, wherein on use of an aqueous solution of the deicer its concentration is from 15 to 25% by weight.

6. The method of claim 1 wherein said deicer comprises from 40 to 60% by weight of sodium formate, from 40 to 60% by weight of sodium chloride and from 0.1 to 2% by weight of said corrosion inhibitor.

7. A deicer for traffic areas comprising from 30 to 70% by weight of sodium formate, from 30 to 70% by weight of sodium chloride and from 0.1 to 3% by weight of a corrosion inhibitor and in the form of solid particles from 0.3 to 10 mm in size.

8. The deicer for traffic areas as claimed in claim 7, comprising from 45 to 63% by weight of sodium formate, from 37 to 55% by weight of sodium chloride and from 0.3 to 2.8% by weight of corrosion inhibitor and in the form of solid particles from 0.5 to 5 mm in size.

9. The deicer for traffic areas as claimed in claim 7, comprising from 58 to 62% by weight of sodium formate, from 38 to 42% by weight of sodium chloride and from 2 to 2.5% by weight of corrosion inhibitor and in the form of solid particles from 1 to 3 mm in size.

10. The deicer for traffic areas as claimed in claim 7, wherein the corrosion inhibitor consists of from 1.8 to 2.2% by weight of sodium metasilicate, from 0.18 to 0.22% by weight of tripotassium phosphate, from 0.02 to 0.07% by weight of styrene-maleic acid copolymers and from 0.0001 to 0.01% by weight of a mixture of 1 part by weight of aminotris(methylenephosphonic acid) and 5 parts by weight of zinc sulfate.

* * * * *